United States Patent [19]
Archibald et al.

[11] Patent Number: 5,369,703
[45] Date of Patent: Nov. 29, 1994

[54] COMMAND AND CONTROL SIGNALLING METHOD AND APPARATUS

[75] Inventors: James L. Archibald; William R. Davis, Kurt E. Holmquist, of Clearwater, Fla.

[73] Assignee: AT&T Corp., Murray Hill, N.J.

[21] Appl. No.: 779,455

[22] Filed: Jun. 3, 1993

[51] Int. Cl.⁵ .............................................. H04K 1/00
[52] U.S. Cl. ............................................ 380/9; 380/20; 380/49
[58] Field of Search ............... 380/9, 20, 23, 25, 28, 380/30, 33, 49

[56] References Cited
U.S. PATENT DOCUMENTS

| | | | |
|---|---|---|---|
| 3,919,462 | 11/1975 | Hartung et al. | 380/20 X |
| 4,322,745 | 3/1982 | Saeki et al. | 380/20 X |
| 4,611,242 | 9/1986 | Williams | 380/20 |
| 4,677,685 | 6/1987 | Kurisu | 380/20 X |
| 4,716,588 | 12/1987 | Thompson et al. | 380/20 |

*Primary Examiner*—Bernarr E. Gregory
*Attorney, Agent, or Firm*—John A. Caccuro

[57] ABSTRACT

A local communication apparatus (e.g., a modem) is arranged to detect when a remote communication apparatus desires to switch from the data mode and enter a command/control mode. To accomplish mode switching, the remote apparatus sends a scrambled escape pattern, scrambled using a proprietary polynomial, over the data channel. After detecting the escape pattern the local apparatus switches to the command/control mode. In this mode, the remote and local apparatuses communicate using the proprietary scrambler/descrambler polynomial.

12 Claims, 3 Drawing Sheets

COMMAND AND CONTROL SIGNALLING METHOD AND APPARATUS

TECHNICAL FIELD

The present invention relates to communication systems and, more particularly, to a method for enabling interconnected communication apparatuses to signal each other when changes in the operating mode are desired.

BACKGROUND OF THE INVENTION

Currently modems provide command/control mode signaling over a low speed secondary channel superimposed over the primary data channel. Commands sent from one modem to another using a secondary channel are sent at a rate much slower than the primary channel data rate. Moreover, this communication method requires substantial real time processing and filtering to separate the two combined channels. Some other arrangements send command and control information (hereinafter command) via special training sequences. The disadvantage of such a scheme is that a modem's training sequence may not comply with globally accepted CCITT standards.

Thus, there is a continuing need to improve the method by which command and data information are communicated between modems.

SUMMARY OF THE INVENTION

In accordance with the present invention, interconnected digital data communication apparatuses (e.g., modems) communicate both command and data information bidirectionally over a communication facility, the data information being scrambled to generate a first bit pattern signal and command information being scrambled to generate a second bit pattern signal. A communication apparatus may then quickly signal a remote communication apparatus to change from a data operating mode to a command operating mode using an escape pattern (a predetermined code) scrambled into a second bit pattern signal of the command mode. At the remote communication apparatus, the escape pattern is detected by a mode control circuit which signals the receiver and the transmitter units of the remote communication apparatus to switch from the data mode to the command mode. Once in the command mode, another predetermined code word is used to signal when the communication apparatuses are to switch back to the data mode.

According to one feature, the transmitter includes a scrambler which operates under control of the mode control circuit to scramble data mode transmissions in a different manner than command mode transmissions. The receiver includes a first descrambler for descrambling received data mode information and a second descrambler for descrambling received command mode information. The operating mode of the receiver is also controlled by the mode control mode circuit.

DETAILED DESCRIPTION

Figure 1:
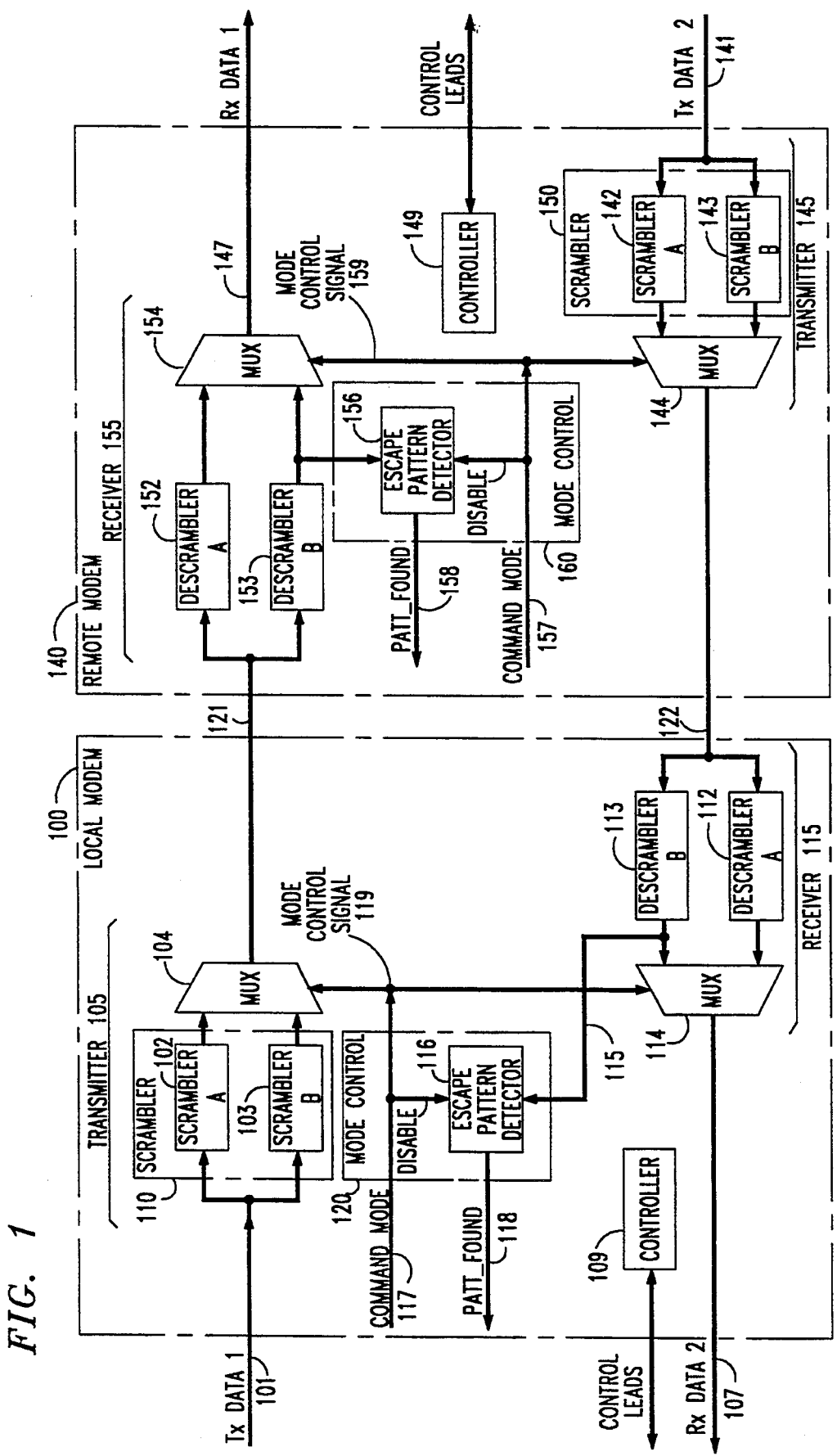
FIG. 1 is an illustrative block diagram of an arrangement including a local modem connected over communication channels to a remote modem where each modem incorporates the present invention.

In the following description, each item or block of each figure has a reference designation associated therewith, the first number of which refers to the figure, in which that item is first located (e.g., 150 is located in FIG. 1 and 201 is located in FIG. 2).

Shown in FIG. 1 is an illustrative block diagram of a local modem 100 connected over communication channels 121 and 122 to a remote modem 140. Note that in FIG. 1 the local and remote modems are illustratively shown to be identical. Only the circuit blocks of modems 100 and 140 which are pertinent to the present invention are described in FIG. 1, the other well-known function blocks will be described in the FIG. 3 description of a communication system employing the present invention. It should be noted that the present invention may, more generally, be utilized in other types of communication apparatus where data, and command information need to be sent over the same communication channel.

Local modem 100 includes a transmitter 105, mode control 120, controller 109, and receiver 115. Similarly, remote modem 140 includes transmitter 145, mode control 160, controller 149 and receiver 155. The transmitters 105 and 145 include a scrambler 110 and 150, respectively, and multiplexer 104 and 144, respectively.

The scrambler 110 may be implemented using one scrambler which uses two different sets of coefficients, one for scrambling data information and one for scrambling command information. Thus, scrambler A 102 and scrambler B 103, illustratively, represent scrambler 110 programmed, respectively, to handle data information and command information. Alternatively, scrambler 110 may be implemented using two separate scramblers, A and B, 102 and 103, respectively. The same implementation options exist for scrambler 150.

The descramblers A and B in receivers 115 and 155, however, must be separate units. The reason will be described in detail in a later paragraph. Mode control 120 and 160 determine whether the modem 100 and 140, respectively, are operating in the data or command mode. Mode control 120 and 160 include an escape pattern detector 116 and 156, respectively.

Controller 109 receives control signals from an external host controller or panel which indicate when data information or command information will be on lead Tx data1 101. In response to these external control signals controller 1139 sets the command mode leads 117 to either logic 0 or logic 1. A logic 0 indicating that a data mode and a logic 1 indicating that a command mode of operation is desired at a modem. Similarly, controller 149 receives external control signals which indicate when data information or command information will be on lead Tx data 2 141. In response thereto, controller 149 sets the command mode lead 157 to either a logic 0 or logic 1.

The operation of our invention, as illustratively embodied in modems 100 and 140, is best understood by describing the various operating modes of the modems. With a continued reference to FIG. 1, note that both the local modem 100 and remote modem 140 each have two scrambler/descrambler pairs (scramA/descramA and scramB/descramB). ScramA/descramA uses a characteristic scrambling polynomial which is different from that used by scramB/descramB. Illustratively, the scramA/descramA uses a non-proprietary polynomial which may, illustratively, be that which is specified in the CCITT specification for a particular modulation (i.e., V.29, V.33, etc.). For improved security the polynomial for scramB/descramB would typically be proprietary but yet have a sufficiently long period so as to effectively randomize the data.

Each modem 100 and 140 also has an escape pattern detector (116 and 156, respectively) which sets the pattern found (PATT_FOUND) flag when it detects the illustrative sequence of N consecutive escape patterns in the descrambled data stream. Note, the number N of consecutive escape patterns can be set at any practical limit (e.g., 8). An escape pattern may be any predetermined data pattern or flag, illustratively the 8-bit pattern "0111 1110". This illustrative escape pattern may be used because it is automatically generated by a typical serial communication controller device (part of the external host computer) when each modem is configured for HDLC operation.

We first assume that local modem 100 and remote modem 140 are already operating in a data operating mode. FIG. 2 shows the scram/descram pairs utilized at modems 100 and 140 during data operating mode 201. Normal data transmission is through the scramA/descramA pair. Thus, transmit data (Tx DATA1) is received by modem 100 over lead 101 and sent via scramA 102 and multiplexer (mux) 104 over voice frequency (VF) channel 121 to modem 140. At modem 140 the signal is processed by descramA 152 and mux 154 into received data (Rx DATA1) and output over lead 147. Similarly, transmit data (Tx DATA2) is received over lead 141 by modem 140 and sent via scramA 142 and mux 144 over VF channel 122 to modem 100. At modem 100, where the data is processed by descramA 112 and mux 114 into receive data (Rx DATA2) on lead 107.

Note, the command mode leads 117 and 157, determine, respectively, which scram/descram pair, A or B, that muxes 144, 154, 104 and 114 select. A logic 0 output selects pair A while a logic 1 selects pair B.

We assume that the local modem 100 is requested (via control leads) to change from the data mode to the command/control mode (hereinafter command mode) by setting command mode lead 117 to ON state and by sending an escape sequence or pattern (such as a stream of HDLC flags) to remote modem 140. Note, the remote modem 140 may be commanded to institute the mode change operation in the same manner. When sending the escape pattern, the local modem 100 switches from scramA/descramA pair to the scramB/descramB pair. Controller 109 of modem 100 sends the escape pattern for a predetermined time period, or until it is detected that modem 140 has switched to command mode. During such time, controller 109 holds command mode lead 117 at logic 1. This ensures that muxes 104, 114 will keep scramB/descramB pair 103, 113 connected during the command mode.

When local modem 100 is transmitting in the command mode, through scramB 103, it will have its own escape pattern detector 116 disabled via command mode lead 117. In this case the local modem 100 is prevented from detecting an escape pattern when it is actually trying to send an escape pattern. Therefore, other command mode signaling will not be detected by escape pattern detector 116.

Figure 2:
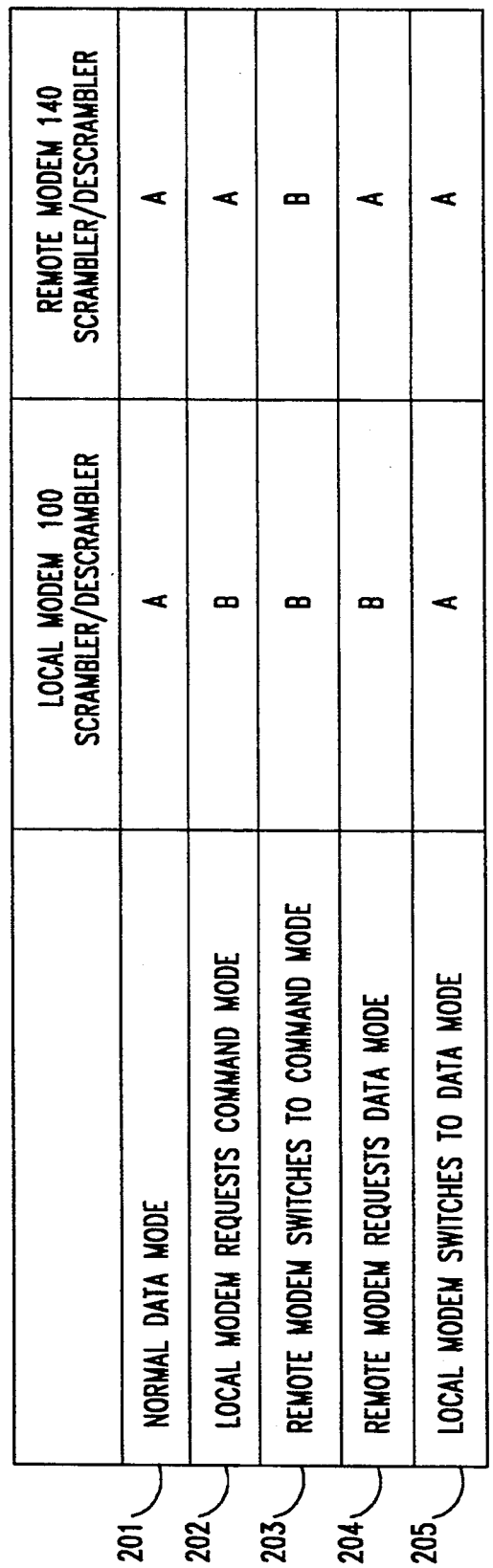
FIG. 2 is a table indicating the various operating states of the modems.

At this particular point in time, with reference to 202 of FIG. 2, we note that local modem 100 is using scramB/descramB pair 103, 113 while remote modem 140 is using scramA/descramA pair 152, 142. Since both modems 100 and 140 have not yet switched over to scramblerB/descramblerB, a "clear" data channel is not yet available. Completion of the "escape" process (i.e., the process of switching to another scrambler/descrambler pair) is automatically signalled by the establishment of a clear data channel (see 203 of FIG. 2).

The remote modem 140 then detects the escape pattern. Note that remote modem 140 is running both descramA 152 (used for data mode) and descramB 153 (used for command mode) simultaneously. This must always be the case for the present invention to work. The output of descramB 153 provides the input to the escape pattern detector 156. This detector 156 sets the pattern round flag 158 (PATT_FOUND 158) ON if N consecutive escape patterns are detected. The controller 149 receives the PATT_FOUND signal and signals the external controller via the control leads. If the external controller accepts the command mode it signals controller 149 which then sets the command mode signal 157 to logic 1.

The output of descramB 153 is now used as the received data (Rx DATA1). Now both the local and remote modems 100 and 140, respectively, are using their scramB/descramB pairs 103, 113 and 143, 153, respectively, as shown by 203 of FIG. 2. Note, the local modem 100 knows when remote modem 140 has switched by detecting valid information received from remote modem 140. Both modems are now operating in the command mode. Command and control information can thus be sent in both directions at the data rate. It is only when both modem 100 and 140 are in the command mode (i.e., a clear channel exists) that certain link layer entities present in the control sections of the modems will be able to successfully communicate.

A retraining phase (using non-standard CCITT training sequences) is not required when switching from the data mode to the command mode, thus allowing commands to be transferred quickly between modems 100 and 140. For example, at a data rate of 4800 bps this method would allow the local modem 100 to detect a request for command mode in less than 14 msec. (i.e., 8 bits/word×8 words equals 64 bits, which takes less than 14 msec at a 4800 bps data rate).

Note that since a proprietary scramblerB/descramblerB polynomial is used in the command mode, an added degree of data security has been added to network. Moreover, if scramA/descramA was programmable the polynomial could be changed by commands sent during the command mode.

Returning modems 100 and 140 to normal data mode is simple. Since the pair of modems 100, 140 both are in the command mode, it is possible for either modem to command the other to return to the normal data mode. This simply means that in response to either sending or receiving a predetermined command such as "return to data mode command", each modem switches back to using its scramA/descramA pair. Modems 100 and 140 may also include other methods of switching back to the data mode if a command gets lost, i.e., time out or loss of flag-sync indicates a return to the data mode.

Illustratively, assume remote modem 140 desires to switch back to the data mode. Then controller 149, in response to external control signals, sends the appropriate data mode command via scramB 143 and then sets the command mode signal 157 "OFF" which causes muxes 144, 154 to switch to scramA/descramA pair 142, 152 (see 204 of FIG. 2). Local modem 1013 will then switch to scramA/descramA pair 102, 112 after it receives the data mode command sent by remote modem 140. Controller 109 then sets the command mode signal 117 to the OFF condition which causes muxes 104, 114 to switch to scramA/descramA pair 102, 112. Thereafter, data information can be transmitted between modems 100 and 140.

Thus, according to the present invention, the sending/receiving of commands does not require a traditional secondary channel to be superimposed over the primary channel. In fact, our method allows commands to be transferred at the primary channel data rate which is typically much higher than the secondary channel rate.

Figure 3:
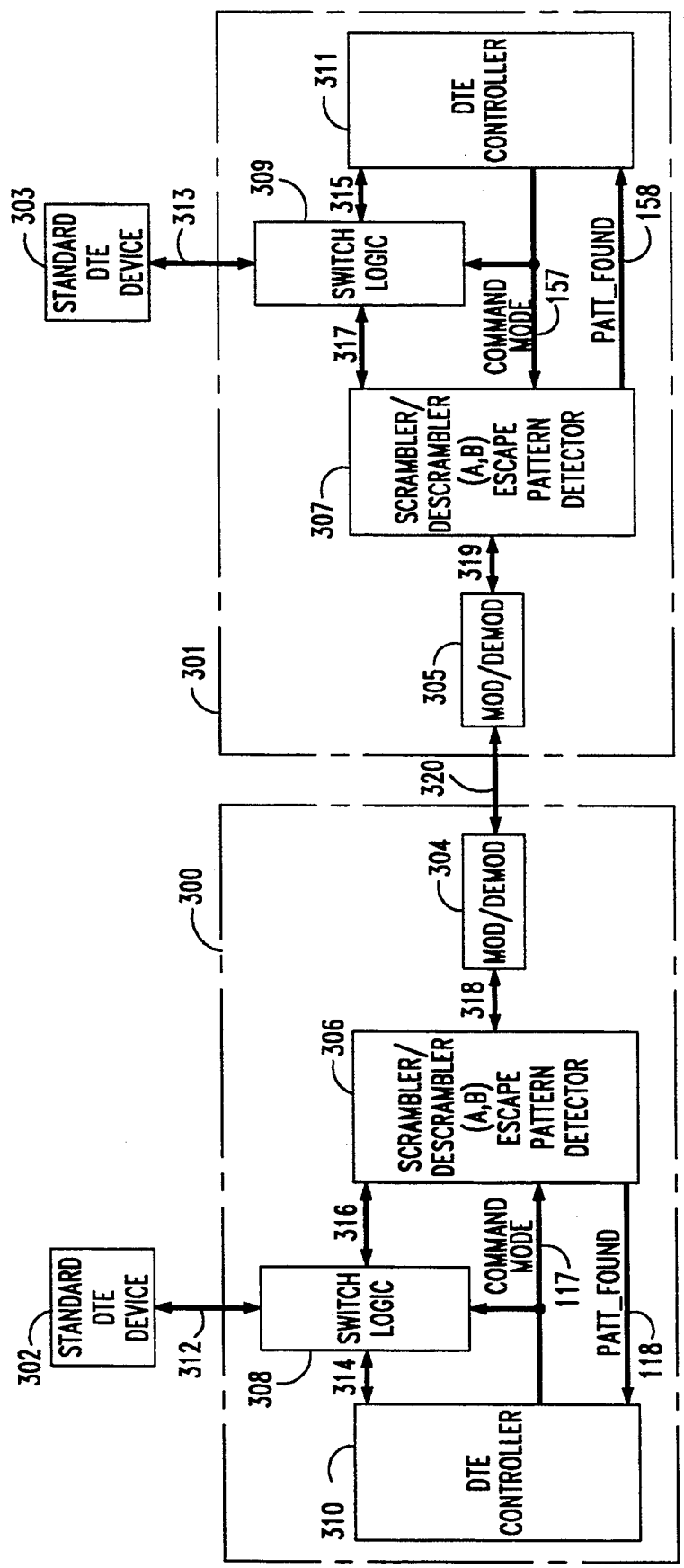
FIG. 3 is a block diagram of a complete communication system employing the present invention.

The block diagram of FIG. 3 shows the invention embodied in a complete communication system. The system consists of modem devices 300 and 301 connected by a voice frequency (VF) circuit 320 (e.g., communication channels 121 and 122). The modems 300 and 301 are connected to standard DTE devices 302 and 303, respectively, via standard EIA-232 or equivalent interfaces 312 and 313.

The modem devices 300 and 301 contain standard modulator/demodulator sections 304 and 305, respectively, and our inventive modified scrambler/descrambler sections 306 and 307, respectively. The latter contain the main elements of this invention (i.e., the elements of modems 100 and 140 of FIG. 1) as previously discussed in detail in the above paragraphs.

Once in the command operating mode either modems 300 or 301 may send a predetermined code word to signal the other modem to return to the data mode. In response to that code word, the DTE controllers 310 and 311 cause standard DTE devices 302 and 303 to be connected.

The DTE controllers 310 and 311 are available to provide command mode communications between modems 300 and 301. These are assumed to contain the HDLC link layer communication function and appropriate control logic as a minimum.

In accordance with the invention, well-known switching logic 308 and 309 is used to enable the DTE controller 310 and 311, respectively, and device 302 and 303, respectively, to make use of the primary channel for communication therebetween. Thus, during the command/control mode, switching logic 308 and 309 connect DTE controllers 310 and 311, respectively, to the serial data interfaces 316 and 317, respectively, via command interfaces 3 14 and 315, respectively, in order that the control functions can be sent over the primary channel of VF circuit 320 between modems 300 and 301. In a similar manner, during the data mode, standard DTE devices 302 and 303 are connected via the interfaces to enable data communications over the primary channel.

The diagram of FIG. 3 shows that the switching logic blocks 308 and 309 and the DTE controllers 310 and 311 are integral to the complete modem device, however, this is not required and these functions could easily be implemented outside of the modem device.

The DTE controllers 310 and 311 have additional command mode signals 117 and 157, respectively, to control the switch logic 308 and 309, respectively, and to control the selection of the A or B units of scrambler/descrambler blocks 306 and 307, respectively. These are the same as the command mode signals 117 and 157 as shown in FIG. 1.

The DTE controller 310 and 311 also receive PATT_FOUND signals from the scrambler/descrambler blocks 306 and 307, respectively.

The general operating sequence events of the system of FIG. 3 employing the invention is now described.

To establish communication with DTE controller 311 in modem 301, DTE controller 310 makes active the command mode signal 117 to scrambler/descrambler function 306 and immediately begins to send messages to DTE controller 311. (It is assumed that DTE controllers 310 and 311 contain the full error detection and recovery mechanisms provided by standard link layer protocols). While waiting for a reply between message transmission attempts, DTE controller 310 sends a continuous sequence of "flag" characters as is normal for the HDLC protocol.

The active condition of the command mode signal 117 switches the command serial interface 314 of DTE controller 310 to the primary serial data interface 316 in place of the standard DTE interface 302. It also causes Scrambler/Descrambler function 306 to switch to scrambler B. This causes the "flag" (i.e., escape pattern) sequence sent by DTE controller 310 to be scrambled in such a way that it can be detected by an escape pattern detector (e.g., 156 in FIG. 1) connected to scrambler B of scrambler/descrambler 307. As a result, scrambler/descrambler 307 makes active the PATT_FOUND signal 158.

The DTE controller 311, upon recognizing the active condition of PATT_FOUND signal 158, if it determines communication with the remote modem is acceptable, makes active command mode signal 157. The active condition of the command mode signal 157 switches the serial command interface 315 of DTF, controller 311 in line with the primary serial data interface 317 in place of the interface 313 to DTE device 303. It also causes scrambler/descrambler function 307 to switch from scrambler A to scrambler B.

The DTE controller 311 now receives valid command messages from DTE controller 310 which are scrambled and descrambled using the scrambler B polynomial. Likewise DTE controller 3 10 now receives valid command messages from DTE controller 311 which are scrambled and descrambled using scrambler B polynomials.

In this sequence, pattern detection is not done at scrambler/descrambler 306 as this function is disabled when the command mode signal 117 becomes active as shown in FIG. 1. DTE controller 310 is able to determine establishment of the circuit by successful communication at the link level with DTE controller 311.

Once in the command operating mode either modem 300 or 301 may send a predetermined code word to signal the other modem to return to the data mode. In response to that code word DTE controllers 310 and 311 cause standard DTE devices 302 and 303 to be connected to scrambler/descramblers 306 and 307, respectively. Scrambler/descrambler 306 and 307 then scramble and descramble data using scrambler polynomial A.

The following are two important points about the present invention which should be noted in detail.

Even though the escape pattern sent by the DTE controllers 310 and 311 (HDLC flags) might be identical to a data sequence seen very frequently on the primary channel, the invention protects against falsely detecting the escape pattern as data which would cause unwarranted disruption of the primary data. This is because the escape pattern detectors 116 and 156 will only respond to a sequence of escape patterns which has been scrambled using the scrambler polynomial B. Data which has been scrambled using polynomial A will not generate the same escape pattern sequence when descrambled by polynomial B.

The command mode signals 117 and 157 have a function which is very similar to that of the standard EIA-232 (V.24) Request to Send interface signal. Likewise, the PATT_FOUND signals 118 and 158 have a function which is very similar to the standard EIA-232 Line Signal Detector signal. With a small change to the logic contained in the Scrambler/Descrambler functions 306 and 307, the DTE controller 310 and 311 can operate very much the same as a standard DTE device without any special considerations being required to work with the functions provided by this invention. The change is simply that the PATT_FOUND signals 118 and 158 are forced to the active state whenever the command mode signals 117 and 157, respectively, are active. With this change, the DTE controllers simply turn on their "request to send" signals 117 and 157 when they have data to send to the other function. Whenever the DTE controllers 310 and 311 detect an active condition on their "carrier detect" signals 118 and 158, they turn on "request to send" and attempt to communicate.

What has been described is merely illustrative of the application of the principles of the present invention. Other arrangements and methods can be implemented by those skilled in the art without departing from the spirit and scope of the present invention.

We claim:

1. Digital data communication apparatus comprising
    transmitter means for scrambling an inputted binary data information signal to generate a first bit pattern signal for transmission over a facility, in response to a first state of a mode control signal, and for scrambling an inputted binary control information signal to generate a second bit pattern signal for transmission over said facility, in response to a second state of said control signal;
    receiver means including
        first means for descrambling a first bit pattern signal received over said facility into a first information signal,
        second means for descrambling a second bit pattern signal received over said facility into a second information signal, and
        selector means, responsive to said first state of said control signal, for selecting said first information signal for output from said receiver means and, responsive to said second state of said control signal, for selecting said second information signal for output from said receiver means; and
    mode control means, operational when said control signal is in said first state, for detecting a predetermined bit pattern in a received second bit pattern signal and in response thereto changing the state of said control signal from said first state to said second state.

2. The apparatus of claim 1 wherein
    said mode control means is responsive to a command mode signal for signaling said second state of said control signal, said command mode signal not originated by said mode control means.

3. The apparatus of claim 2 wherein
    said mode control means disables the detection of the received predetermined bit pattern in response to said command mode signal.

4. The apparatus of claim 1 wherein
    said transmitter means includes
    first means for scrambling said inputted binary data information signal into said first bit pattern signal,
    second means for scrambling said inputted binary control information signal into said second bit pattern signal, and
    multiplexer means for selecting either said first or said second bit pattern signal in response to the state of said control signal.

5. The apparatus of claim 1 wherein
    said mode control means uses said second descrambling means to descramble said second bit pattern signal.

6. The apparatus of claim 1 wherein said data information signal is scrambled using a first polynomial to generate a first randomized bit pattern signal and said control information signal is scrambled using a second polynomial to generate a second randomized bit pattern signal.

7. The apparatus of claim 6 wherein
    said first polynomial is a non-proprietary polynomial, and
    said second polynomial is a proprietary polynomial.

8. Receiver apparatus for use in a digital data communication system comprising
    first means for descrambling a first bit pattern signal received over said facility into a first information signal;
    second means for descrambling a second bit pattern signal received over said facility into a second information signal;
    selector means, responsive to a first state of a control signal, for selecting said first information signal for output from said receiver means and, responsive to said second state of said control signal, for selecting said second information signal for output from said receiver means; and
    mode control means, operational when said control signal is in said first state, for detecting a predetermined bit pattern in a received second bit pattern signal and in response thereto changing the state of said control signal from said first state to said second state.

9. The receiver apparatus of claim 10 wherein
    said first polynomial is a non-proprietary polynomial and
    said second polynomial is a proprietary polynomial.

10. The apparatus of claim 8 wherein said data information signal is scrambled using a first polynomial to generate a first randomized bit pattern signal and said control information signal is scrambled using a second polynomial to generate a second randomized bit pattern signal.

11. A method of operating a digital data communication apparatus comprising the steps of
    sending binary data information scrambled into a first bit pattern signal over a facility, in response to a first state of a mode control signal, and sending binary control information scrambled into a second bit pattern signal over said facility, in response to a second state of said control signal;
    descrambling a first bit pattern signal received over said facility into a first information signal;

descrambling a second bit pattern signal received over said facility into a second information signal;

in response to said first state of said control signal, selecting said first information signal for output from said apparatus and, in response to said second state of said control signal, selecting said second information signal for output from said apparatus;

in response to said control signal in said first state, detecting a predetermined bit pattern in a received second bit pattern signal; and changing the state of said control signal from said first state to said second state.

12. A method of operating a receiver apparatus of a communication system comprising the steps of descrambling a first bit pattern signal received over a facility into a first information signal;

descrambling a second bit pattern signal received over said facility into a second information signal;

in response to said first state of said control signal, selecting said first information signal for output from said apparatus and, in response to said second state of said control signal, selecting said second information signal for output from said apparatus;

in response to said control signal in said first state, detecting a predetermined bit pattern in a received second bit pattern signal; and changing the state of said control signal from said first state to said second state.

* * * * *